US009568709B2

(12) United States Patent
Isobe

(10) Patent No.: US 9,568,709 B2
(45) Date of Patent: Feb. 14, 2017

(54) AUTOMATIC FOCUSING APPARATUS AS WELL AS LENS APPARATUS AND IMAGE PICKUP SYSTEM INCLUDING THE AUTOMATIC FOCUSING APPARATUS

(75) Inventor: Shingo Isobe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 878 days.

(21) Appl. No.: 13/336,049

(22) Filed: Dec. 23, 2011

(65) Prior Publication Data

US 2012/0169917 A1 Jul. 5, 2012

(30) Foreign Application Priority Data

Jan. 5, 2011 (JP) ................................. 2011-000647

(51) Int. Cl.
| | |
|---|---|
| G02B 7/28 | (2006.01) |
| H04N 5/232 | (2006.01) |
| G02B 7/08 | (2006.01) |
| G02B 27/28 | (2006.01) |
| G03B 3/10 | (2006.01) |
| G03B 13/36 | (2006.01) |
| H04N 5/369 | (2011.01) |

(52) U.S. Cl.
CPC .................. G02B 7/285 (2013.01); G02B 7/08 (2013.01); G02B 27/281 (2013.01); G03B 3/10 (2013.01); G03B 13/36 (2013.01); H04N 5/23212 (2013.01); H04N 5/3696 (2013.01)

(58) Field of Classification Search
CPC ....... H04N 5/23212; G02B 7/28; G02B 7/285; G02B 7/36
USPC .................. 348/208.12, 345, 346, 347, 348, 349,348/350, 351, 352, 353, 354, 355, 356, 357
See application file for complete search history.

(56) References Cited

U.S. PATENT DOCUMENTS 7,602,435 B2 * 10/2009 Ishii .............................. 348/345
2004/0057712 A1 3/2004 Sato et al.
(Continued)

FOREIGN PATENT DOCUMENTS

| CN | 1152724 A | 6/1997 |
|---|---|---|
| EP | 1684503 A1 | 7/2006 |

(Continued)

OTHER PUBLICATIONS

Chinese Office Action issued in counterpart Chinese Patent Application No. 201210001555.9 dated Feb. 1, 2014.
(Continued)

Primary Examiner — Twyler Haskins
Assistant Examiner — Akshay Trehan
(74) Attorney, Agent, or Firm — Rossi, Kimms & McDowell LLP

(57) ABSTRACT

An automatic focusing apparatus includes: a first focus detector that detects a first focus evaluation value based on a phase difference; a second focus detector that detects a second focus evaluation value using a signal from an image pickup element; a focusing mechanism; a focus controller that controls the focusing mechanism based on the first focus evaluation value obtained by the first focus detector and the second focus evaluation value obtained by the second focus detector; and a speed setting unit that sets, in a process obtaining an in-focus state by using the focus controller, a driving speed for the focus controller to drive the focusing mechanism based on a first data detected by the first focus detector and the second focus evaluation value.

12 Claims, 12 Drawing Sheets

(56) References Cited

U.S. PATENT DOCUMENTS

| | | |
|---|---|---|
| 2006/0165403 A1 | 7/2006 | Ito |
| 2008/0025714 A1 | 1/2008 | Ishii |
| 2008/0025717 A1 | 1/2008 | Kawanishi |
| 2009/0115882 A1 | 5/2009 | Kawarada |
| 2010/0013947 A1 | 1/2010 | Oikawa |
| 2010/0329656 A1 | 12/2010 | Shintani |

FOREIGN PATENT DOCUMENTS

| | | |
|---|---|---|
| EP | 2146500 A2 | 1/2010 |
| JP | 2005-084424 A | 3/2005 |
| JP | 2006023653 A | 1/2006 |
| JP | 2008122981 A | 5/2008 |
| JP | 2009048123 A | 3/2009 |

OTHER PUBLICATIONS

European Search Report issued Apr. 27, 2012 for corresponding EP12000049.2
Korean Office Action for corresponding KR 10-2012-0000892, mail date Dec. 27, 2013.
EP Office Action issued Jun. 17, 2013 for corres. EP 12000049.2.

\* cited by examiner

FIG. 6
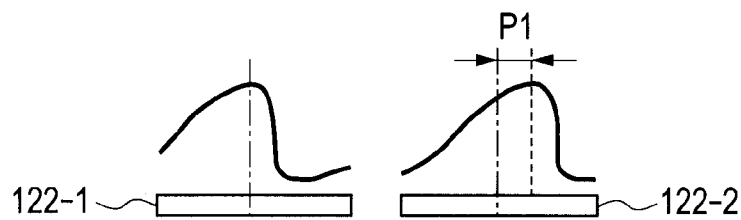
FIG. 7
|  | THRESHOLD VALUE [1] | THRESHOLD VALUE [2] |
|---|---|---|
| CONTRAST AF EVALUATION THRESHOLD VALUE ARRAY A (HIGH CONTRAST) | 160 | 80 |
| CONTRAST AF EVALUATION THRESHOLD VALUE ARRAY B (LOW CONTRAST) | 80 | 40 |
FIG. 8A
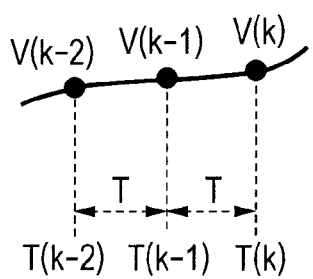
FIG. 8B
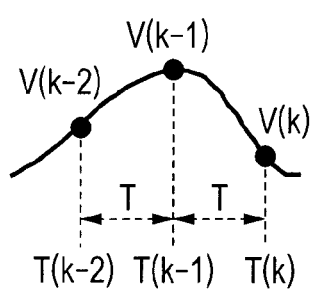
FIG. 8C
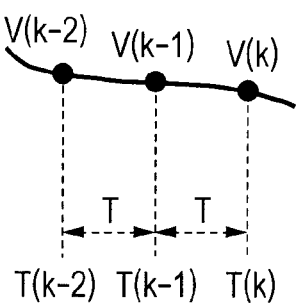

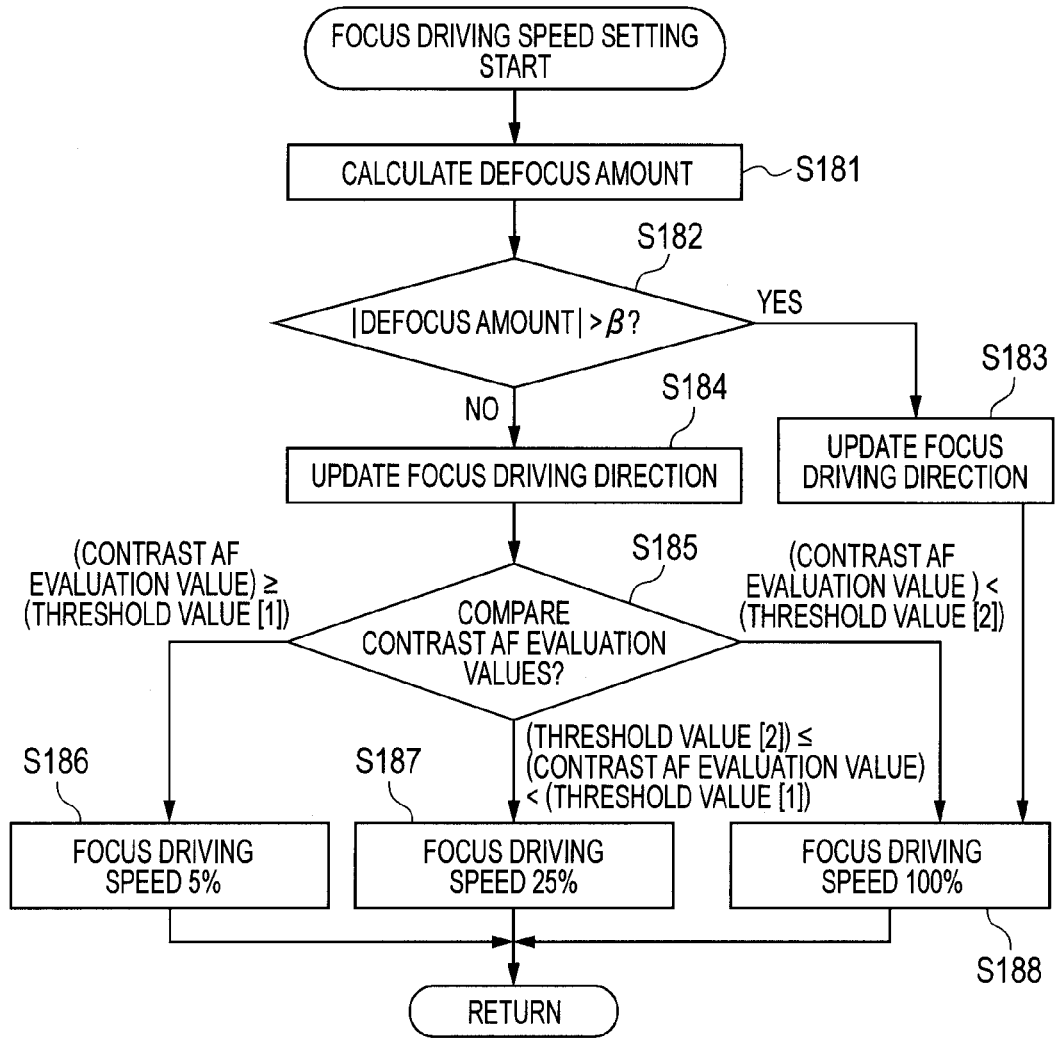

AUTOMATIC FOCUSING APPARATUS AS WELL AS LENS APPARATUS AND IMAGE PICKUP SYSTEM INCLUDING THE AUTOMATIC FOCUSING APPARATUS

BACKGROUND OF THE INVENTION

Field of the Invention

The present invention relates to an automatic focusing apparatus as well as a lens apparatus and an image pickup system including the automatic focusing apparatus, and particularly, to an automatic focusing apparatus with an automatic focus function of a contrast method and a phase difference method using a taken image.

Description of the Related Art

Conventionally, various automatic focus (AF) techniques in an image pickup apparatus, such as a camera and a video camera, are proposed. For example, phase difference AF of a TTL (Through The Lens) method is proposed, in which a separation unit is included in an optical path in an imaging optical system, and an in-focus state is detected by separated beams to perform AF control. External measure AF of a non-TTL method is also proposed, in which a beam of external light different from the beam in an imaging optical system is used. Contrast AF based on a so-called hill-climbing method is further proposed, in which an image signal output from an image pickup element is used to calculate a focal point evaluation value. Hybrid AF with a combination of the phase different AF, the external measure AF and the contrast AF is also proposed.

Among these, electric charge according to the beam from an object is accumulated on a photoelectric conversion element in a focal point detecting apparatus in the phase difference AF and the external measure AF. A two-image signal read from the photoelectric conversion element is used to perform correlation computation to calculate a deviation amount, i.e. a phase difference, of images. In this case, a degree of coincidence between two images is handled as a correlation evaluation value to calculate a target value to an in-focus point. In general, a phase difference with an extreme and maximum correlation evaluation value is set as a highly reliable target value. The target value is then converted to a target position of a focus lens based on a defocus amount to the in-focus point and distance information to the object, and the drive of the focus lens is controlled. The object distance can be directly obtained in the phase difference AF and the external measurement AF, and the in-focus determination can be quickly performed.

In the contrast AF, a high frequency component extracted from an image signal by a filter of a band required for the in-focus determination is extracted as a contrast AF evaluation value. The focal point is adjusted by moving and controlling the focus lens to maximize the contrast AF evaluation value. When an object is imaged, the position of the focus lens with the maximum contrast AF evaluation value is usually the in-focus point. In this way, the image signal obtained based on the output signal from the image pickup element that images the object is used to perform the in-focus determination in the contrast AF method, and highly accurate focusing is possible.

Various methods for controlling an accumulating operation of the focal point detecting sensor of the phase difference AF and the external measurement AF are proposed. For example, there is a control method of finishing the accumulating operation when the signal reaches a predetermined signal level based on AGC (Auto Gain Control) control. Another example includes a control method of finishing the accumulating operation when a predetermined maximum accumulating time period has passed even if the signal does not reach a predetermined signal level. Both of the two types of accumulation control methods may be used to handle a wide dynamic range of object luminance due to various imaging conditions.

AF that attains both the focus speed and the focus accuracy is enabled by forming the hybrid AF with a combination of the features of the AF methods described above. However, if the luminance or the contrast of the object is low, the accumulating operation of the phase difference AF method and the external measurement AF method may require a long time. Therefore, conventional examples for performing automatic focusing in the case where the luminance or the contrast of the object is low are proposed.

For example, in Japanese Patent Application Laid-Open No. 2009-048123, the phase difference AF is terminated, and the focusing operation is performed only by the contrast AF when it is determined that the object luminance or the contrast is low. In the case where the object luminance is low, the accumulation by the phase difference sensors requires a long time. Therefore, the processing time can be reduced by an amount of the accumulating time period by performing the focusing operation only by the contrast AF.

In Japanese Patent Application Laid-Open No. 2006-023653, the search range of the contrast AF is set based on the depth of field and the object luminance. When the depth of field is shallow and when the object luminance is high, the focal point can be detected even if the search range is narrowed down. The center point of the search range is set as the target position of the phase difference AF. According to the configuration, the drive of the focus lens is efficiently controlled by driving the focus by the phase difference AF outside of the search range and switching to focus driving by the contrast AF inside of the search range.

However, in the conventional techniques disclosed in the patent documents, the time required for focusing may be different depending on the imaging conditions. More specifically, in the conventional driving methods of focus lens, the AF method is different between when the contrast of the object is high and when the contrast of the object is low. In Japanese Patent Application Laid-Open No. 2009-048123, the focal point detection is attempted only by the contrast AF for the low contrast object, and the focusing time is long. In Japanese Patent Application Laid-Open No. 2006-023653, after switching to the contrast AF near the focus, the driving interval of the focus lens for sampling and calculating the contrast AF evaluation value is constant. Furthermore, the search range is wide when the contrast is low, and as a result, the focusing time is long.

As for the contrast AF evaluation value, the curve characteristics and the peak value of the contrast AF evaluation value until focusing are different between high contrast and low contrast. Particularly, the contrast AF evaluation value does not change much from the defocus state to the in-focus point when the contrast is low, and the prediction of the curve characteristics and the peak position is difficult. As a result, to prioritize the focus accuracy, the sampling interval of the focus lens position of the contrast AF evaluation value calculation needs to be reduced, and the focusing time is long.

An object of the present invention is to improve the focus lens driving method until focusing regardless of the level of the contrast of the object and to enable quick and highly accurate focusing compared to the conventional methods.

SUMMARY OF THE INVENTION

To attain the object, the present invention provides a focal point detecting apparatus including: a first focus detector that detects a first focus evaluation value based on a phase difference; a second focus detector that detects a second focus evaluation value using a signal from an image pickup element; a focusing mechanism; a focus controller that controls the focusing mechanism based on the first focus evaluation value obtained by the first focus detector and the second focus evaluation value obtained by the second focus detector; and a speed setting unit that sets, in a process obtaining an in-focus state by using the focus controller, a driving speed for the focus controller to drive the focusing mechanism based on a first data detected by the first focus detector and the second focus evaluation value.

According to the present invention, the contrast of the object is detected based on a signal obtained from the phase difference sensor. A threshold for comparison with the contrast AF evaluation value is determined based on the detected contrast. The driving speed of the focus lens during contrast AF is changed based on the comparison result between the contrast AF evaluation value and the threshold value. As a result, the focal point detection interval changes based on the contrast, and an automatic focusing apparatus capable of highly accurate focusing in a short time under various image taking conditions can be provided.

Further features of the present invention will become apparent from the following description of exemplary embodiments with reference to the attached drawings.

BRIEF DESCRIPTION OF THE DRAWINGS

FIG. 6 is a diagram illustrating high contrast waveforms of external measurement sensors according to the first embodiment.

FIG. 7 is a diagram illustrating contrast AF evaluation threshold values according to the first embodiment.

FIGS. 8A, 8B and 8C are diagrams illustrating in-focus determination based on contrast AF evaluation values according to the first embodiment.

FIG. 10 is a subroutine-4 of the process according to the first embodiment.

FIG. 11 is an example of setting a focus driving speed based on the contrast AF evaluation threshold value according to the first embodiment.

DESCRIPTION OF THE EMBODIMENTS

Preferred embodiments of the present invention will now be described in detail in accordance with the accompanying drawings.

Figure 1:
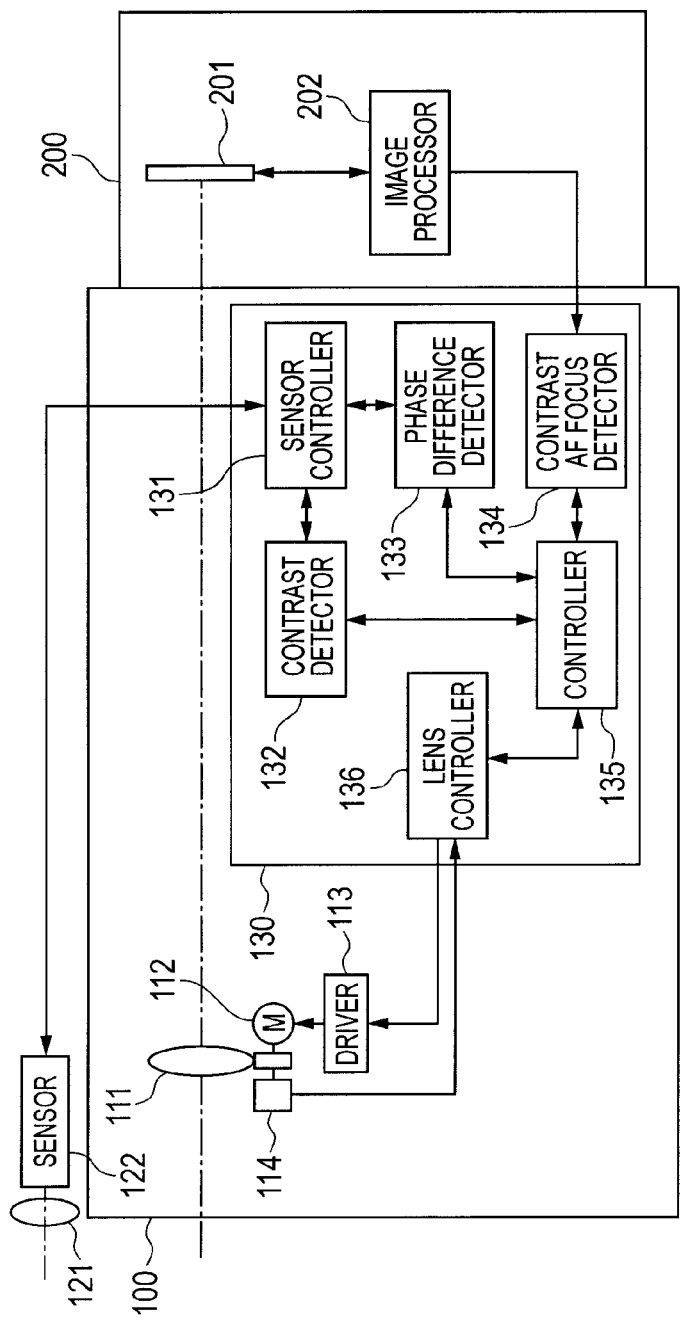
FIG. 1 is a block diagram according to a first embodiment.

FIG. 1 is a block diagram according to the embodiments of the present invention.

First Embodiment

An automatic focusing apparatus according to a first embodiment of the present invention will now be described.

FIG. 1 illustrates a block diagram of the automatic focusing apparatus according to the first embodiment of the present invention. A lens apparatus 100 includes an image pickup optical system including a focus lens 111, and the focus lens 111 is constituted to have a mechanism that can be driven in an optical axis direction by a motor 112. A driver 113 drives the motor 112. A position detector 114 detects the position of the focus lens 111. The focus lens 111, the motor 112, the driver 113 and the position detector 114 form a focusing mechanism.

The automatic focusing apparatus of the present embodiment includes a first focus detector arranged separately from the image pickup optical system, and the first focus detector includes pairs of sensor imaging lenses 121 and sensors 122. A beam passing through the sensor imaging lenses 121 is a beam different from a beam passing through the focus lens 111. The beam passed through the sensor imaging lenses 121 enters the sensors 122. The sensors 122 include sensors of a plurality of areas, each area including a line sensor formed by a plurality of pixels. In each area of the sensors 122, beams separated into two by the sensor imaging lenses 121 form a pair of object images (hereinafter, referred to two images). Each area of the sensors 122 photoelectrically converts the two images to accumulate the two images as an electric charge and generates a two-image signal. A phase difference (first focus evaluation value) according to the distance from the lens apparatus 100 can be obtained from the two-image signal.

Figure 2:
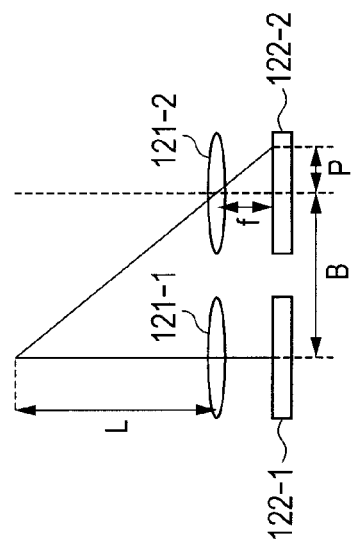
FIG. 2 is a block diagram of a sensor according to the first embodiment.

FIG. 2 illustrates a conceptual diagram of the phase difference using the sensor imaging lenses 121 and the external measurement sensors 122. Reference numerals 121-1 and 121-2 denote a pair of lenses forming the sensor imaging lenses 121. Reference numerals 122-1 and 122-2 denote a pair of area sensors forming the sensors 122. A distance L to the object can be calculated by the following Expression (1) using a phase difference P obtained from image signals formed on the sensors 122-1 and 122-2, a focal length f of the sensor imaging lenses 121 and a base length B of the sensors 122. Although the phase difference equivalent to the interval between the two images is theoretically 0 according to FIG. 2 when the object distance L is infinity, the phase difference actually indicates a value close to 0. This is because the focal length f of the sensor imaging lenses 121 and the base length B of the sensors 122 have individual differences due to manufacturing errors. On the other hand, if the object distance L is at a close point, the phase difference indicates a large value.

$$L = f \times B / P \quad (1)$$

Returning to the description of FIG. 1, the lens apparatus 100 is detachable with respect to from an image pickup apparatus 200 that picks up an object image formed by the lens apparatus, and the lens apparatus 100 and the image pickup apparatus 200 form an image pickup system. The beam passed through the focus lens 111 forms an image on an image pickup element 201. An image processor 202 converts a signal to an image signal after obtaining the signal from the image pickup element 201 and outputs the image signal outside of the image pickup apparatus 200. The image signal output outside of the image pickup apparatus 200 is input to the lens apparatus 100.

The lens apparatus 100 includes a CPU 130, and the CPU 130 includes a sensor controller 131, a contrast detector 132, a phase difference focus detector 133, a contrast AF focus detector 134, a controller 135 and a lens controller 136.

The sensor controller 131, connected to the sensors 122, controls the start and termination of accumulating operations of the areas of the sensors 122 and controls reading of accumulated data. The contrast detector 132 detects a contrast (first data) of the accumulated data read by the sensor controller 131. Detailed description related to the contrast detection will be described later. The phase difference detector 133 performs a known correlation computation based on the accumulated data of the sensors 122 read by the sensor controller 131 and calculates a phase difference (first focus evaluation value). The object distance is calculated using Expression (1). More specifically, data, such as the phase difference, the object distance based on the phase difference, and the contrast of the accumulated data, is obtained based on the detected data from the first focus detector. The contrast AF focus detector 134 as a second focus detector of the automatic focusing apparatus of the present invention performs filter computing for extracting high frequency components from the obtained image signal based on the input of the image signal from the image pickup apparatus 200 and then calculates a contrast AF evaluation value (second focus evaluation value) necessary to detect the focal point. The controller 135 uses the contrast data, the object distance and the contrast AF evaluation value to calculate a focus target position of the focus lens 111. Details of the calculation method of the focus target position will be described later. The lens controller 136 drives the focus lens 111 to the focus target position calculated by the controller 135. The lens controller 136 also obtains the position of the focus lens 111 from the position detector 114 and stores the position.

Figure 3:
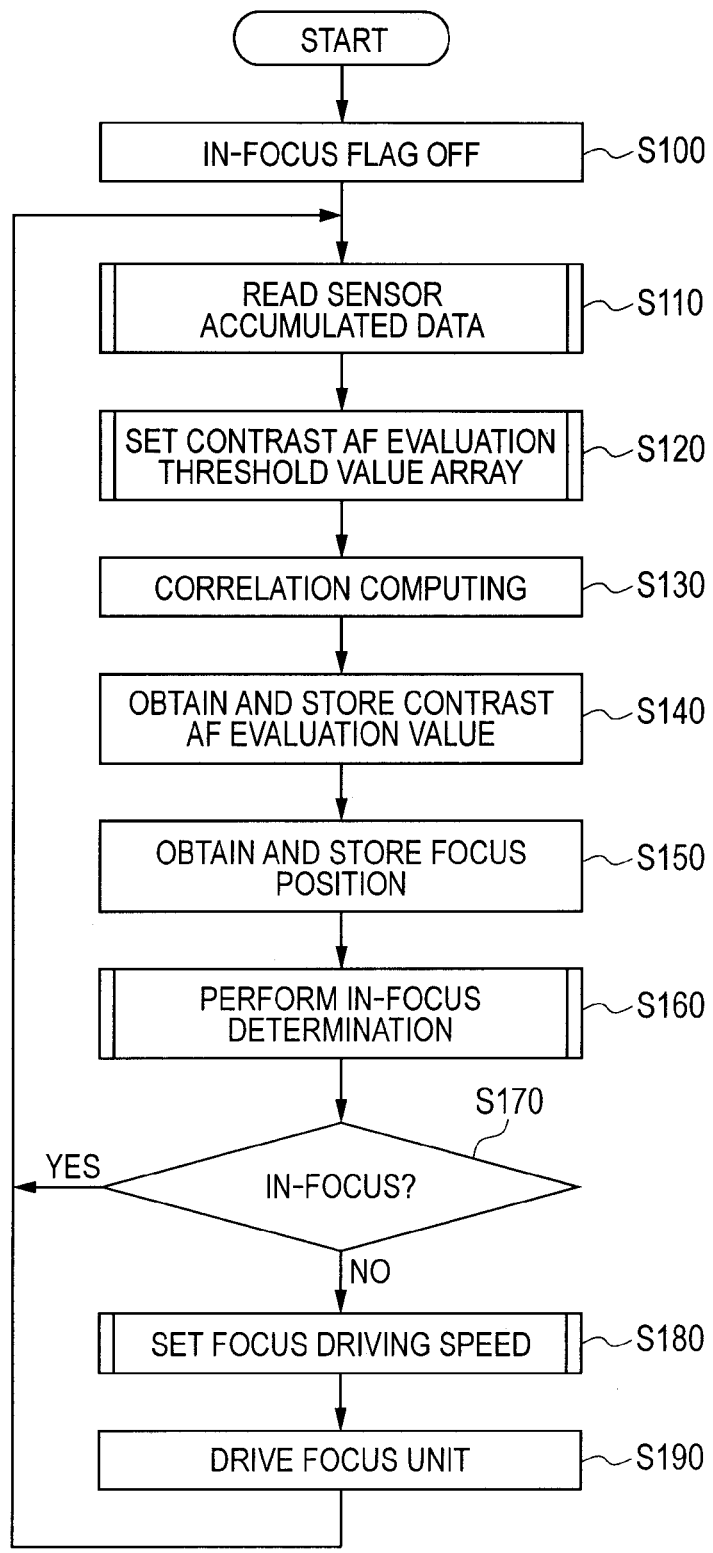
FIG. 3 is a flow chart of a process according to the first embodiment.

FIG. 3 is a flow chart illustrating a flow of an automatic focusing process in the lens apparatus 100. The CPU 130 controls the processes according to a computer program stored in a memory (not illustrated).

When the power of the lens apparatus 100 is turned on, the process of the lens CPU 130 is executed from step S100.

Figure 4:
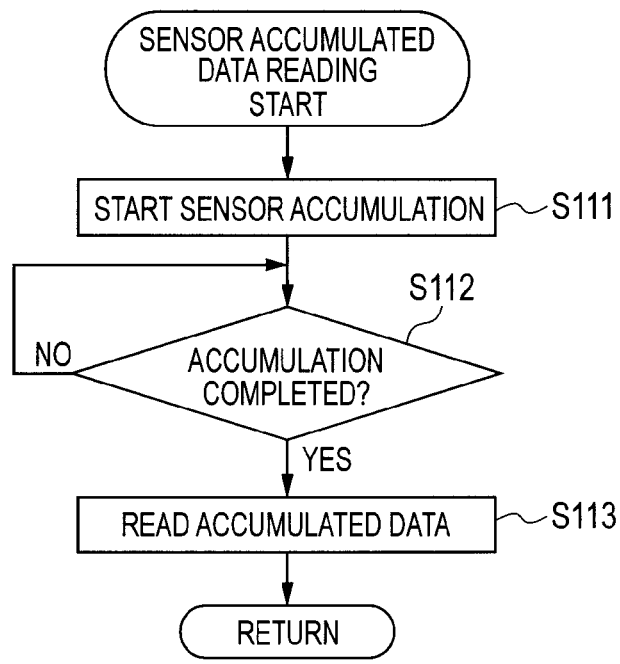
FIG. 4 is a subroutine-1 of the process according to the first embodiment.

In step S100, the CPU 130 switches an in-focus flag to OFF. The in-focus flag being ON indicates an in-focus state, and the in-focus flag being OFF indicates an out-of-focus state. The process proceeds to step S110, and the sensor controller 131 controls the accumulation in the sensors 122 and reads data. FIG. 4 illustrates a subroutine of step S110. In step S111, the sensor controller 131 executes an initialization process of the sensors 122 and starts the accumulation. The process proceeds to step S112, and the sensor controller 131 waits for the completion of the accumulation in the sensors 122. The process proceeds to step S113 when the accumulation by the sensors 122 is completed, and the sensor controller 131 reads the accumulated data of the sensors 122 and stores the accumulated data in the memory (not illustrated). The subroutine of FIG. 4 is finished.

Figure 5:
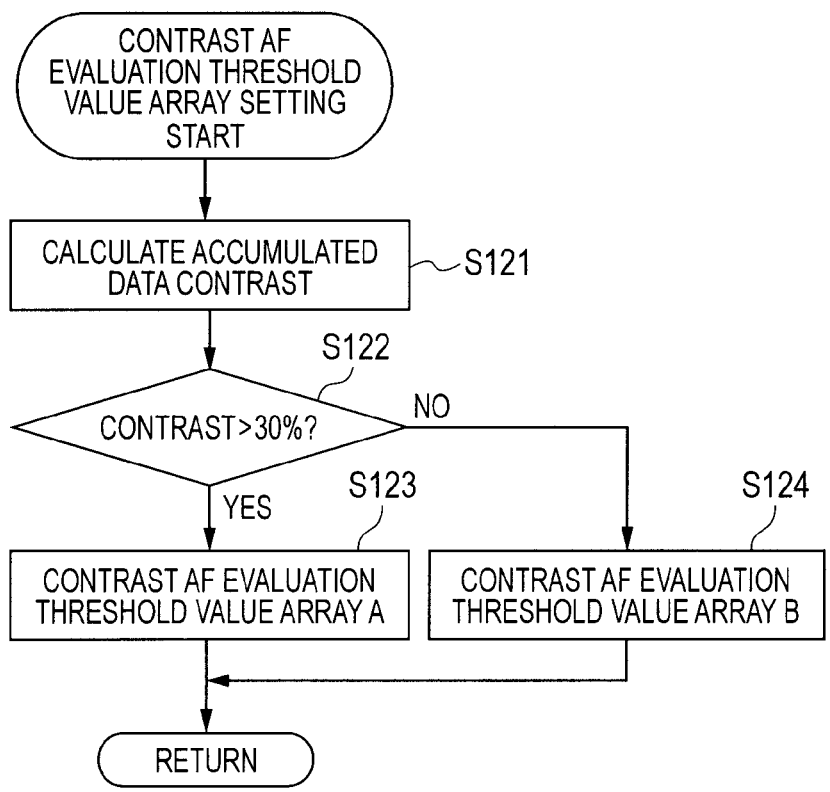
FIG. 5 is a subroutine-2 of the process according to the first embodiment.

Returning to the description of the flow chart of FIG. 3, the contrast AF evaluation threshold value is set in step S120. FIG. 5 illustrates a subroutine of step S120. In step S121, the contrast detector 132 obtains the accumulated data of the sensors 122 from the sensor controller 131 and calculates the contrast.

FIG. 6 illustrates an example of the read accumulated data. Reference numerals 122-1 and 122-2 of FIG. 6 indicate the pair of sensors. Ratios between differences between minimum values and maximum values of waveforms of 122-1 and 122-2 at this time and all ranges of the accumulated data are calculated as contrasts, and the smaller contrast of the two is set as contrast data (first data). Returning to the description of the subroutine of FIG. 5, whether the contrast calculated in step S121 is greater than 30% is determined in step S122. In the case where the contrast is greater than 30%, it is determined that the object is a high contrast object, and the process proceeds to step S123. On the other hand, in the case where the contrast is equal to or smaller than 30% in step S122, it is determined that the object is a low contrast object, and the process proceeds to step S124. Although the determination standard is 30% in determining whether the contrast is high or low, the determination standard may be an arbitrary value because the standard for determining the level of the contrast is different depending on the number of bits of the accumulated data or the sensor sensitivity.

FIG. 7 illustrates an example of contrast AF evaluation threshold value arrays set in steps S123 and S124 of FIG. 5. In step S123, the controller 135 (threshold value setting unit) sets a contrast AF evaluation threshold value array A as a threshold value during high contrast. The contrast AF evaluation threshold value array is array data and includes a threshold value [1] and a threshold value [2]. In the setting example here, 160 is set to the threshold value [1], and 80 is set to the threshold value [2]. In step S124, the controller 135 similarly sets a contrast AF evaluation threshold value array B as a threshold value during low contrast. The controller 135 sets 80 to the threshold value [1] and 40 to the threshold value [2]. It is desirable that the values of the elements of the contrast AF evaluation threshold value array A are set greater than the respective values of the elements of the contrast AF evaluation threshold value array B. The threshold values are used to control the focus driving speed, in which the focus driving speed is set smaller when the contrast AF evaluation value is equal to or greater than the threshold value compared to when the contrast AF evaluation value is smaller than the threshold value. Although the present embodiment describes an example in which the contrast AF evaluation threshold value array includes two elements, the present invention is not limited to this. The advantageous effects of the present invention can also be attained when an array including three or more elements is used. Details in relation to the method of using the threshold values will be described later.

Once the contrast AF evaluation threshold value arrays are set in step S123 or S124 of FIG. 5, the subroutine of FIG. 5 is terminated, and the process proceeds to step S130 of FIG. 3. In step S130, the phase difference focus detector 133 performs a known correlation computations and calculates the phase difference between the two images obtained from the sensors 122. In the example of waveforms illustrated in FIG. 6, P1 denotes the phase difference. When the correlation computation is completed, the process proceeds to step S140.

In step S140, contrast AF evaluation values are obtained and stored. The contrast AF focus detector 134 uses the image signal input from the image processor 202 to calculate and hold the contrast AF evaluation values. Since S110 to S160 or to S190 are repeatedly executed in the flow chart of FIG. 3, the contrast AF evaluation value is held every time the process of step S140 is executed. In this case, the contrast AF evaluation values of three periods in total, the current period and past two periods, are held. FIGS. 8A to 8C illustrate an example of obtaining the contrast AF evaluation values of three periods in total. When the current time is designated with T(k), a contrast AF evaluation value V(k−1) is the maximum value of three samples at a time T(k−1), i.e. the previous process, as illustrated in FIG. 8B. In this case, hill-climbing determination indicates true in in-focus determination of step S160 described later, and it is determined that in-focus state is achieved. Since the contrast AF evaluation value V(k−1) is not the maximum value at the time T(k−1) in the patterns of FIGS. 8A and 8C, it is not determined that hill-climbing determination indicates true.

The process proceeds to step S150, and the lens controller 136 obtains and stores the positions of the focus lens 111. As in step S140, the focus positions of three periods are held.

Figure 9:
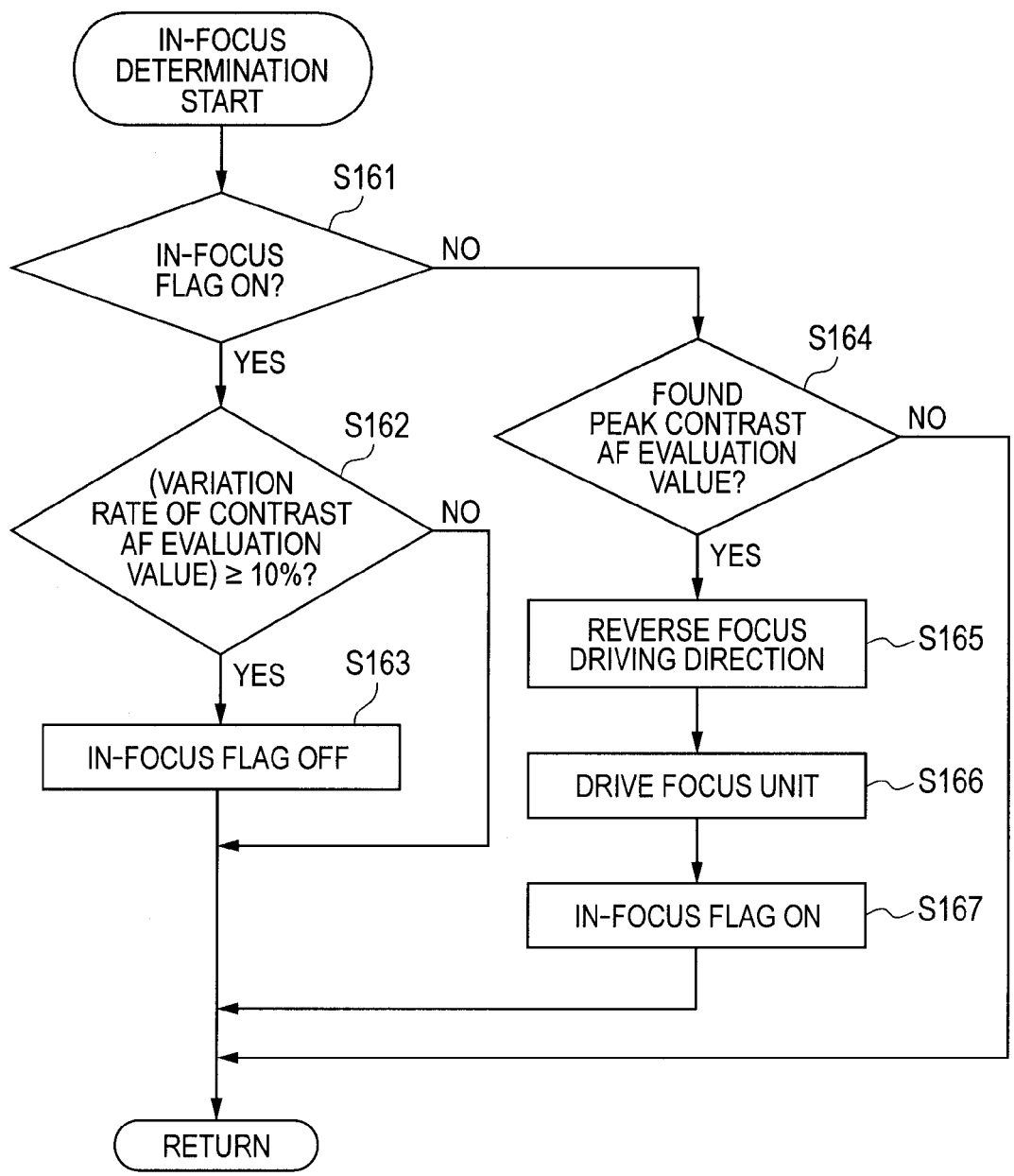
FIG. 9 is a subroutine-3 of the process according to the first embodiment.

In step S160, the in-focus determination is performed. FIG. 9 illustrates a subroutine illustrating details of step S160. A history of three samples of the contrast AF evaluation values obtained in step S140 is used to perform the in-focus determination.

In step S161 of FIG. 9, whether the in-focus flag is ON is determined. In the case of true, the process proceeds to step S162, and in the case of false, the process proceeds to step S164. Step S161 is designed to determine whether the state was the in-focus state when the same step S161 was executed the last time. In step S162, whether the variation rate of the three periods of the contrast AF evaluation values obtained in step S140 is greater than 10% is determined as illustrated in FIGS. 8A to 8C. For example, an average value of the obtained contrast AF evaluation values is calculated, and whether the difference value between each contrast AF evaluation value and the average value is greater than 10% of the average value is determined. In the case where the variation rate is greater than 10%, it is determined that the in-focus state turned into out-of-focus state. The process proceeds to step S163, and the in-focus flag is set to OFF. In the case where the variation rate is equal to or smaller than 10% in step S162, it is determined that the in-focus state is maintained, and the subroutine of FIG. 9 is finished while the in-focus flag remains ON. Although the threshold for the variation rate of the contrast AF evaluation values is 10% in step S162, the threshold value for determining the variation rate is arbitrary, and the rate is not limited to 10%. The method of calculating the variation rate is not limited to the method described above.

Returning to the description of the subroutine of FIG. 9, whether the peak of the contrast AF evaluation value of the three periods obtained in S140 is found is determined in step S164 of FIG. 9. In the case where the hill-climbing determination indicates true in step S164, it is determined that the point at the time T(k−1), i.e. the previous sample, is the in-focus point, and the process proceeds to step S165. In the case where the hill-climbing determination indicates false, the subroutine of FIG. 9 is finished. The direction of driving the focus lens 111 is reversed in step S165, and the lens controller 136 drives the focus lens 111 to the position of the previous sample in step S166. Describing with reference to FIG. 8B, in step S166 of FIG. 9, the focus lens 111 is driven to a position F(k−1) where V(k−1), which is one period before the contrast AF evaluation value V(k) at the current time T(k), is obtained. Therefore, the focus lens 111 can be driven to the in-focus position. Once step S166 is executed, the in-focus flag is set to ON in step S167, and the subroutine of FIG. 9 is finished.

Returning to the description of the flow chart of FIG. 3, whether the in-focus state is achieved is determined in step S170. In the case where the in-focus flag set in step S160 is ON, the process is executed again from step S110, and if false, the process proceeds to step S180. FIG. 10 illustrates a subroutine indicating details of step S180.

A defocus amount is calculated in step S181 of FIG. 10. A focus delivery amount to the target position can be calculated from the relationship between the phase difference calculated in step S130, the position of the focus lens 111 calculated in step S150, and the image pickup optical system (not illustrated). The calculation method is a public knowledge, and the detail is omitted. The process proceeds to step S182, and whether the absolute value of the defocus amount is greater than β is determined. In the case where step S182 indicates true, i.e. In the case where the absolute value of the defocus amount is greater than β, it is determined that the position of the focus lens 111 is at a position significantly away from the target position indicated by the phase difference, and the process proceeds to step S183. On the other hand, in the case where step S182 indicates false, it is determined that the position of the focus lens 111 is near the in-focus position, and the process proceeds to step S184.

In step S183, the focus driving direction is updated based on the defocus amount calculated in step S181. The process proceeds to step S188, and the driving speed of the focus lens 111 is set to 100%, i.e. the maximum driving speed. Subsequently, the subroutine of FIG. 10 is finished.

In step S184, the focus driving direction is updated based on the stored contrast AF evaluation values. The process proceeds to step S185, and the controller 135 (focus controller) compares the contrast AF evaluation threshold value set in step S120 with the contrast AF evaluation value obtained in step S140. In the case where the contrast AF evaluation value is equal to or greater than the threshold value [1], it is determined that the position of the focus lens 111 is significantly close to the in-focus point, and the process proceeds to step S186. In step S186, the lens controller 136 (speed setting unit) sets the focus driving speed to 5% of the maximum speed to increase the search accuracy of the in-focus point. In the case where the contrast AF evaluation value is equal to or greater than the threshold value [2] and smaller than the threshold value [1] in step S185, it is determined that the position of the focus lens 111 is near the focus but there is a small offset from the in-focus point, and the process proceeds to step S187. In step S187, the driving speed of the focus lens 111 is set to 25%, which is faster than 5% set in step S186. In the case where the contrast AF evaluation value is smaller than the threshold value [2] is step S185, it is determined that the position of the focus lens 111 is in an area close to the focus but there is an offset from the in-focus point, and the process proceeds to step S188. In step S188, the driving speed of the focus lens 111 is set to 100% of the maximum speed. FIG. 11 illustrates the contrast AF evaluation threshold value array and an example of setting the driving speed of the focus lens 111 described in steps S185 to S188. When one of steps S186, S187, and S188 is executed, the subroutine of FIG. 10 is finished.

Returning to the description of the flow chart of FIG. 3, the process proceeds to step S190 after step S180 executed, and the focus lens 111 is driven at the driving speed set in step S180. Subsequently, the process is executed again from step S110.

Figure 12:
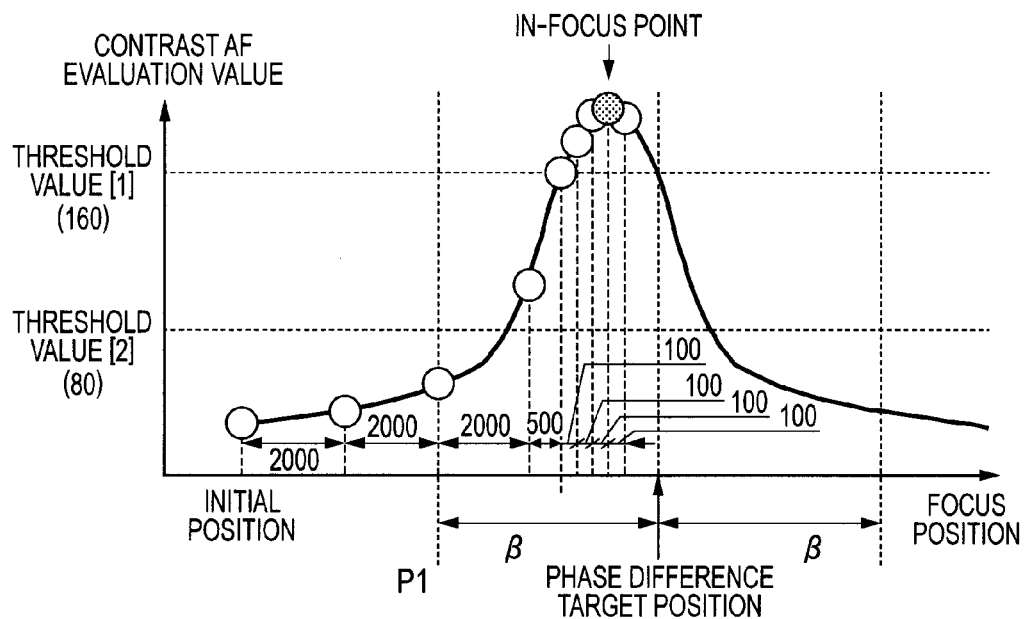
FIG. 12 is a diagram illustrating a focusing process of a high contrast object according to the first embodiment.

FIG. 12 illustrates a process until focusing when high contrast waveforms as illustrated in FIG. 6 are obtained from the sensors 122. In FIG. 12, the horizontal axis denotes the position of the focus lens 111, and the vertical axis denotes the contrast AF evaluation value. The contrast obtained from the waveforms of FIG. 6 is determined to be high in step S122 of FIG. 5. In this case, the threshold value [1]=160 and the threshold value [2]=80 illustrated in FIG. 7 are set as the contrast AF evaluation threshold value array A in step S123. The driving speed of the focus lens 111 with respect to the threshold values [1] and [2] is as illustrated in FIG. 11. The flow chart of FIG. 3 is executed when the position of the focus lens 111 is at the initial position of FIG. 12. Consequently, S183 and S188 of FIG. 10 are executed, and the focus lens 111 is driven at speed 2000 up to the position offset by β from the target position indicated by the phase difference detector 133. When the position of the focus lens 111 is driven closer to the in-focus point than the position offset by β from the target position indicated by the phase difference detector 133, the speed of the focus lens 111 is changed based on the comparison between the contrast AF evaluation value and the threshold values [1] and [2]. As the focus lens 111 approaches the in-focus point, the driving speed of the focus lens 111 is reduced from 2000 to 500 and to 100 based on the comparison of the threshold values, and the focus lens 111 reaches the in-focus point illustrated in FIG. 12.

Circles in FIG. 12 indicate timing of calculating the contrast AF evaluation values, and the calculation is performed at a constant period. An example of the period of the image signal includes 1/60 second. FIG. 12 illustrates that the sampling interval is shortened in the direction of the focus lens position as the focus lens 111 is slowed down.

Figure 13:
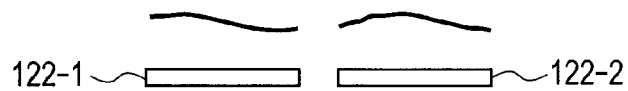
FIG. 13 is a diagram illustrating a low contrast waveform of the external measurement sensor according to the first embodiment.
Figure 14:
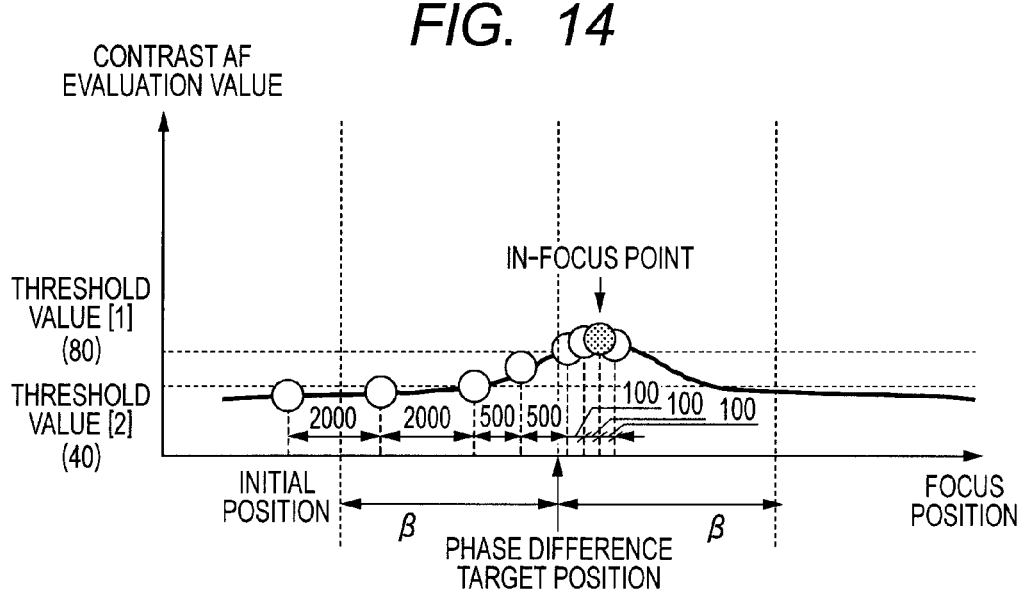
FIG. 14 is a diagram illustrating a focusing process of a low contrast object according to the first embodiment.

FIG. 14 illustrates a process until focusing when low contrast waveforms as illustrated in FIG. 13 are obtained from the sensors 122. As in FIG. 12, the horizontal axis denotes the position of the focus lens 111, and the vertical axis denotes the contrast AF evaluation value in FIG. 14. In step S122 of FIG. 5, it is determined that the contrast of the waveforms of FIG. 12 is low. In this case, the threshold value [1]=80 and the threshold value [2]=40 illustrated in FIG. 7 are set as the contrast AF evaluation threshold value array B in step S124. The driving speed of the focus lens 111 with respect to the threshold value [1] and the threshold value [2] at this point is as illustrated in FIG. 11. The flow chart of FIG. 3 is executed when the focus lens 111 is positioned at the initial position of FIG. 14. Consequently, as described, S183 to S188 of FIG. 10 are executed up to the position offset by β from the target position indicated by the phase difference focus detector 133, and the focus lens 111 is driven at speed 2000. When the position of the focus lens 111 is driven closer to the in-focus point than the position offset by β from the target position indicated by the phase difference focus detector 133, the speed of the focus lens 111 is changed based on the comparison between the contrast AF evaluation value and the threshold values [1] and [2]. As described, while the focus lens 111 approaches the in-focus point, the driving speed of the focus lens 111 is reduced from 2000 to 500 and to 100 based on the comparison with the threshold values, and the focus lens 111 reaches the in-focus point illustrated in FIG. 14. Compared to FIG. 12, the contrast is low in FIG. 14. In FIG. 14, even if the range of the contrast AF evaluation value until focusing is narrow, the in-focus point can be searched as in FIG. 12 by lowering the threshold values [1] and [2] without reducing the driving speed of the focus lens 111.

In this way, the contrast AF evaluation threshold value is switched according to the level of the contrast of the waveforms obtained from the phase difference sensors 122. As a result, a quick and highly accurate automatic focusing process is possible even if the contrast is different depending on the object.

Second Embodiment

An example of switching the contrast AF evaluation threshold value array based on the contrast of the waveforms obtained from the phase difference sensors and switching the driving speed of the focus lens by comparing the contrast AF evaluation value with the threshold values is described in the first embodiment. An example of configuration that allows quick and highly accurate automatic focusing of an object under a dark imaging environment will be illustrated in a second embodiment.

In the first embodiment, the phase difference sensor waveforms of FIG. 6 are used to describe an example of a high contrast object. If the same object is shot in an environment with low surrounding illuminance, phase difference sensor waveforms similar to the waveforms illustrated in FIG. 6 can be obtained by waiting for the completion of known AGC accumulation. The contrast of the phase difference sensor waveforms obtained here is determined to be high because the determination is based on the peak and bottom of the data in the method described in the first embodiment. Meanwhile, the luminance peak value of the image signal input to the contrast AF focus detector 134 of FIG. 3 is low. From the perspective of using the phase difference sensors, it is desirable to improve the accuracy of the correlation computation by waiting for the accumulation until an appropriate dynamic range is secured. On the other hand, if the dynamic range of the luminance level of the image signal is low, it is the same as handling a low contrast object, and it is difficult to determine an optimal driving speed of the focus lens in a focusing operation using the contrast AF evaluation value.

Therefore, the second embodiment will describe an example allowing appropriate setting of the driving speed of the focus lens under the dark imaging environment and allowing quick and highly accurate automatic focusing. Specifically, the contrast AF evaluation threshold value array can be appropriately determined by measuring the accumulating time period of the phase difference sensors and determining the level of the contrast from the dynamic range of the data and the accumulating time period (first data).

Figure 15:
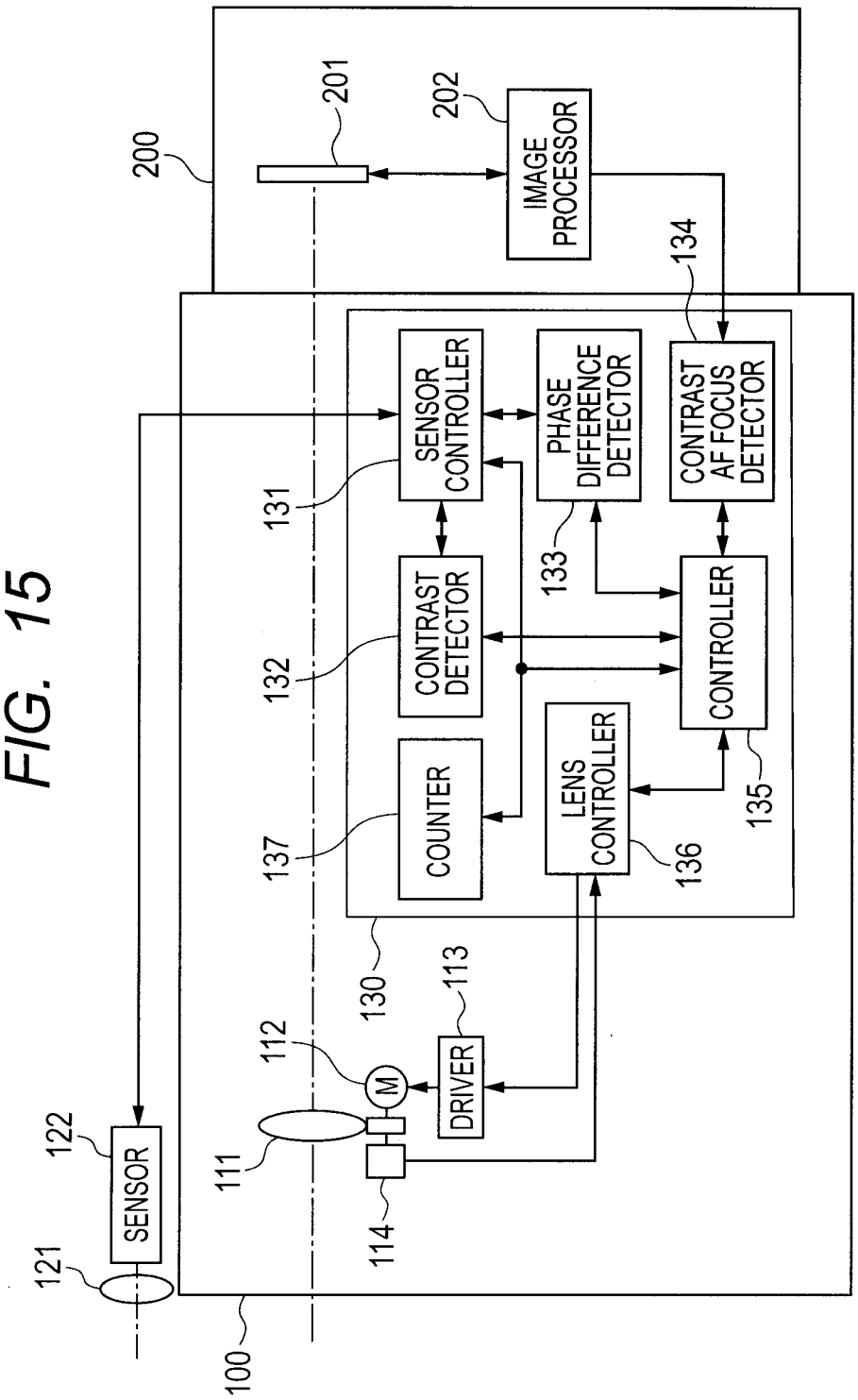
FIG. 15 is a block diagram according to a second embodiment.

FIG. 15 illustrates a block diagram according to the second embodiment. In the configuration of FIG. 15, the same functions as in FIG. 1 illustrated in the first embodiment are designated with the same reference numerals, and the description is omitted. The CPU 130 includes a counter 137 that measures the accumulating time period of the sensors 122.

Figure 16:
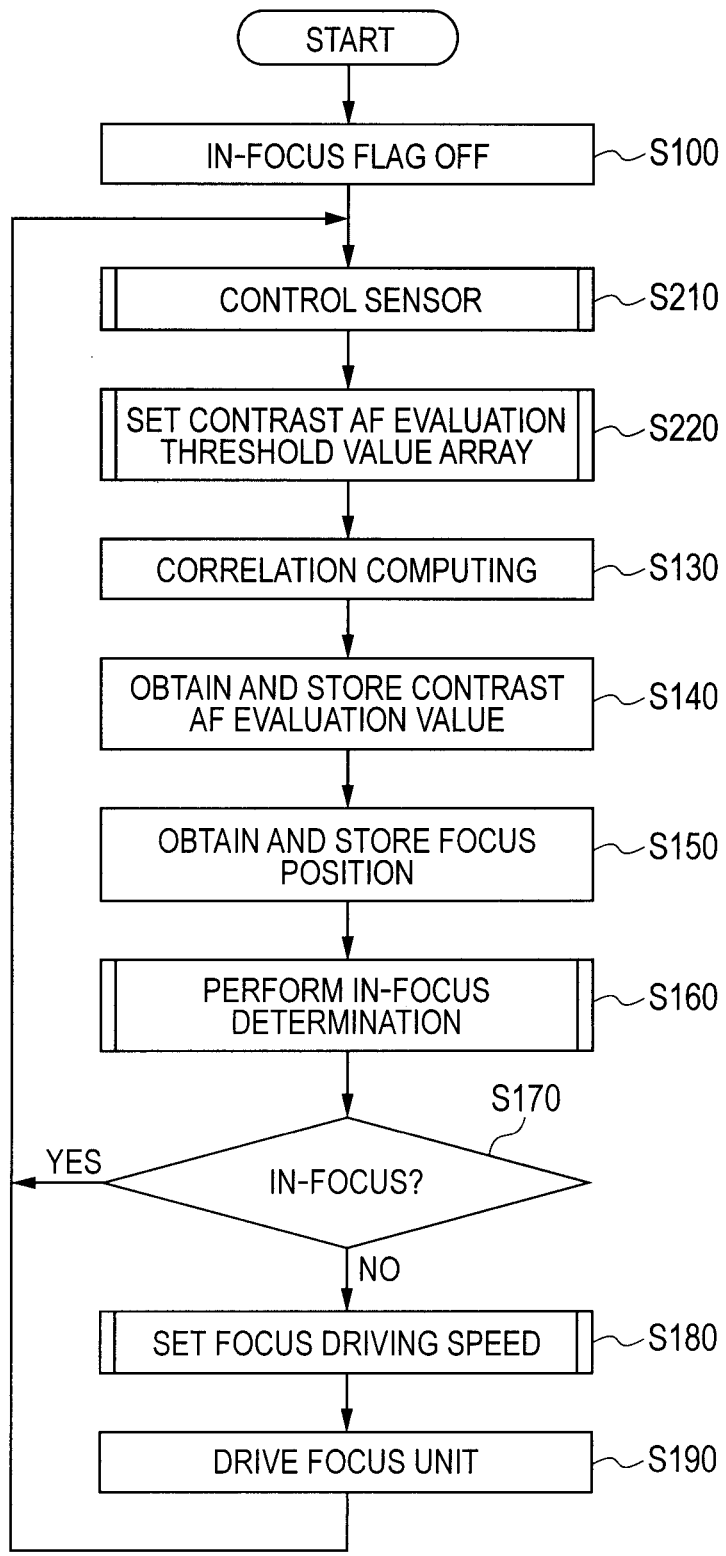
FIG. 16 is a flow chart of a process according to the second embodiment.

FIG. 16 is a flow chart illustrating a flow of an automatic focusing process in the lens apparatus 100. In the flow chart of FIG. 16, the same functions as in the flow chart of FIG. 3 illustrated in the first embodiment are designated with the same reference numerals, and the description is omitted. The CPU 130 controls the processes according to a computer program stored in a memory (not illustrated).

Figure 17:
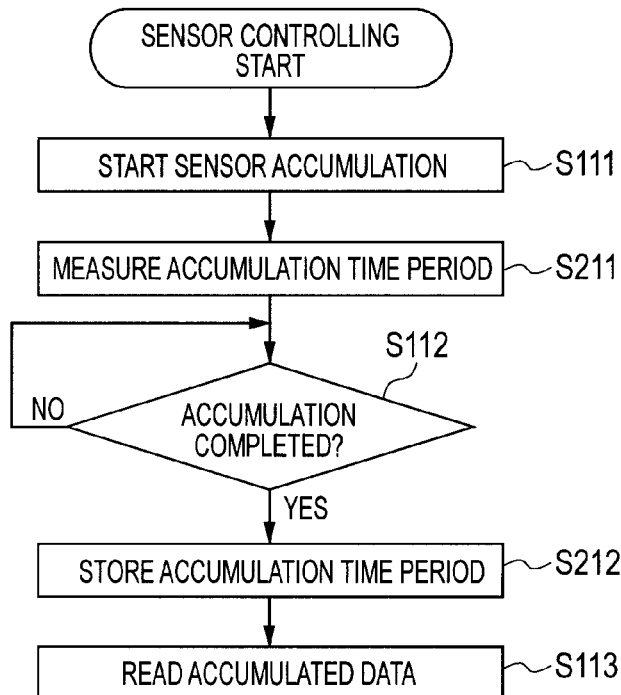
FIG. 17 is a subroutine-1 of the process according to the second embodiment.

When the power of the lens apparatus 100 is turned on, the CPU 130 proceeds to step S100. As in the first embodiment, the CPU 130 sets the in-focus flag to OFF and proceeds to step S210. FIG. 17 illustrates a subroutine of step S210.

Figure 18:
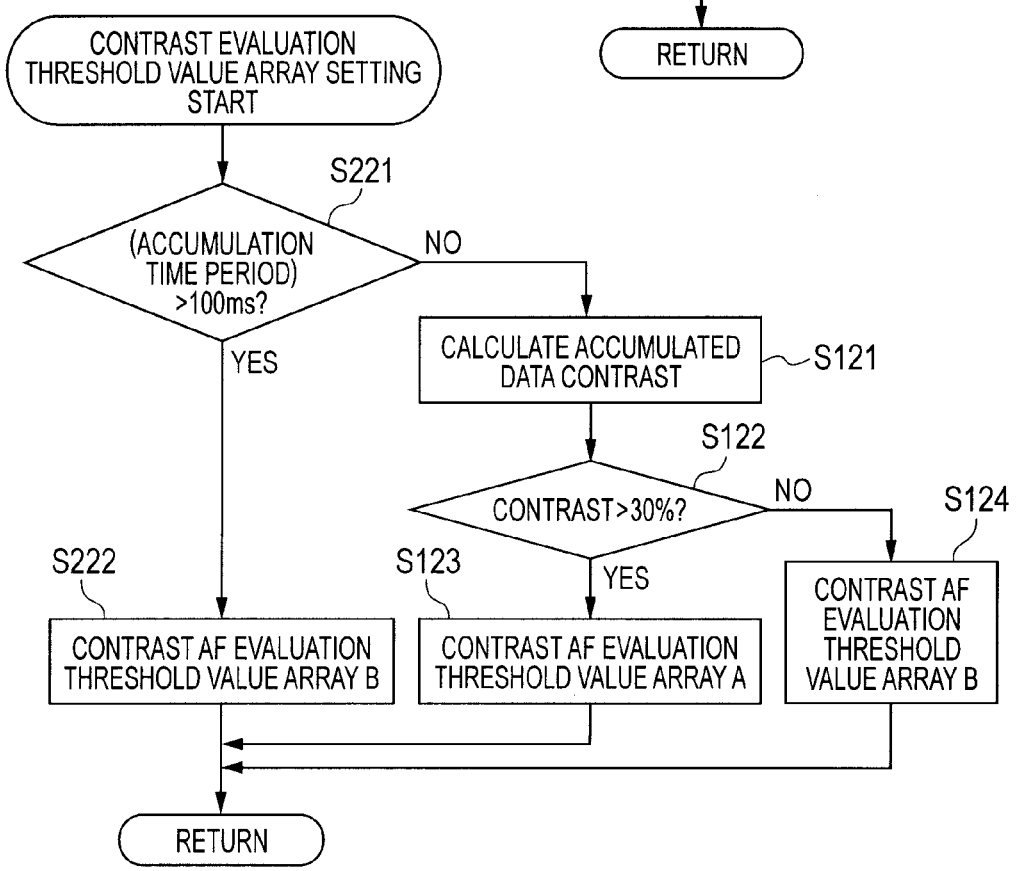
FIG. 18 is a subroutine-2 of the process according to the second embodiment.

In FIG. 17, the accumulation in the sensors 122 is started in step S111 as in the first embodiment. The process proceeds to step S211, and the counter 137 starts measuring the accumulating time period of the sensors 122. The process proceeds to S112 to wait for the completion of the accumulation by the sensors 122 as in the first embodiment. Once the accumulation in the sensors 122 is completed, the process proceeds to step S212. In step S212, the counter 137 stores the accumulating time period of the sensors. The process proceeds to step S113, and the sensor controller 131 reads the accumulated data of the sensors 122. After the completion of step S113, the subroutine of FIG. 17 is finished, and the process proceeds to step S220 FIG. 16. FIG. 18 illustrates a subroutine of step S220.

In step S221 of FIG. 18, whether the accumulating time period stored in step S212 of FIG. 17 is longer than 100 [ms] is determined. If the accumulating time period is longer than 100 [ms], it is determined that the luminance of the object is low, and the process proceeds to step S222. The contrast AF evaluation value array B is set as in step S124 of FIG. 5 of the first embodiment. In this case, the threshold value [1]=80 and the threshold value [2]=40 are set as in FIG. 7 of the first embodiment. If the accumulating time period is shorter than 100 [ms] in step S221, the process proceeds to step S121.

Although whether the luminance is low is determined based on the accumulating time period 100 [ms], the accumulating time period may be an arbitrary value, and the value may be set according to the sensitivity or characteristics of the phase difference sensors.

Steps S121 to S124 are the same as the processes executed in S121 to S124 described in FIG. 5 of the first embodiment, and the description is omitted. When the subroutine of FIG. 18 is finished, the process returns to step S130 of FIG. 16.

Steps S130 to S190 of FIG. 16 are the same processes as in FIG. 3 of the first embodiment, and the description is omitted.

Unlike the first embodiment, if high contrast waveforms as illustrated in FIG. 6 are obtained from the sensors 122 and the accumulating time period of the sensors 122 is long, the process until getting to an in-focus state is a driving method during low contrast as illustrated in FIG. 14. As described at the top of the present embodiment, even if the contrast of the waveforms obtained from the sensors 122 is high, the luminance of the image signal obtained from the image pickup apparatus 200 is low if the luminance of the object is low. Therefore, the dynamic range of the contrast AF evaluation value until getting to an in-focus state is narrow. Therefore, it is desirable to set the contrast AF evaluation threshold value array used for a low contrast object described in the first embodiment to determine the focus driving speed.

In this way, even if the luminance or the contrast is different depending on the object, a quick and highly accurate automatic focusing process can be executed by using the contrast of the data and the accumulating time period obtained from the sensors 122 to switch the contrast AF evaluation threshold value array.

Third Embodiment

Examples of switching the contrast AF evaluation threshold value array based on the contrast of the waveforms and the accumulating time period obtained from the phase difference sensors are described in the first and second embodiments. In a third embodiment, an example of configuration that can attain the same advantages effects without switching the contrast AF evaluation threshold value array will be described. Specifically, the controller 135 (evaluation value gain applying unit) applies a gain to an obtained contrast AF evaluation value (second focus evaluation value) based on a contrast (second data) obtained from the phase difference sensors to obtain a gain-applied contrast AF evaluation value (third focus evaluation value). In the control of the focus adjustment, the gain-applied contrast AF evaluation value can be evaluated to optimize the driving speed of the focus lens without switching the image evaluation threshold value array.

A block diagram according to the third embodiment has the same configuration as the configuration of FIG. 1 illustrated in the first embodiment, and the description is omitted.

Figure 19:
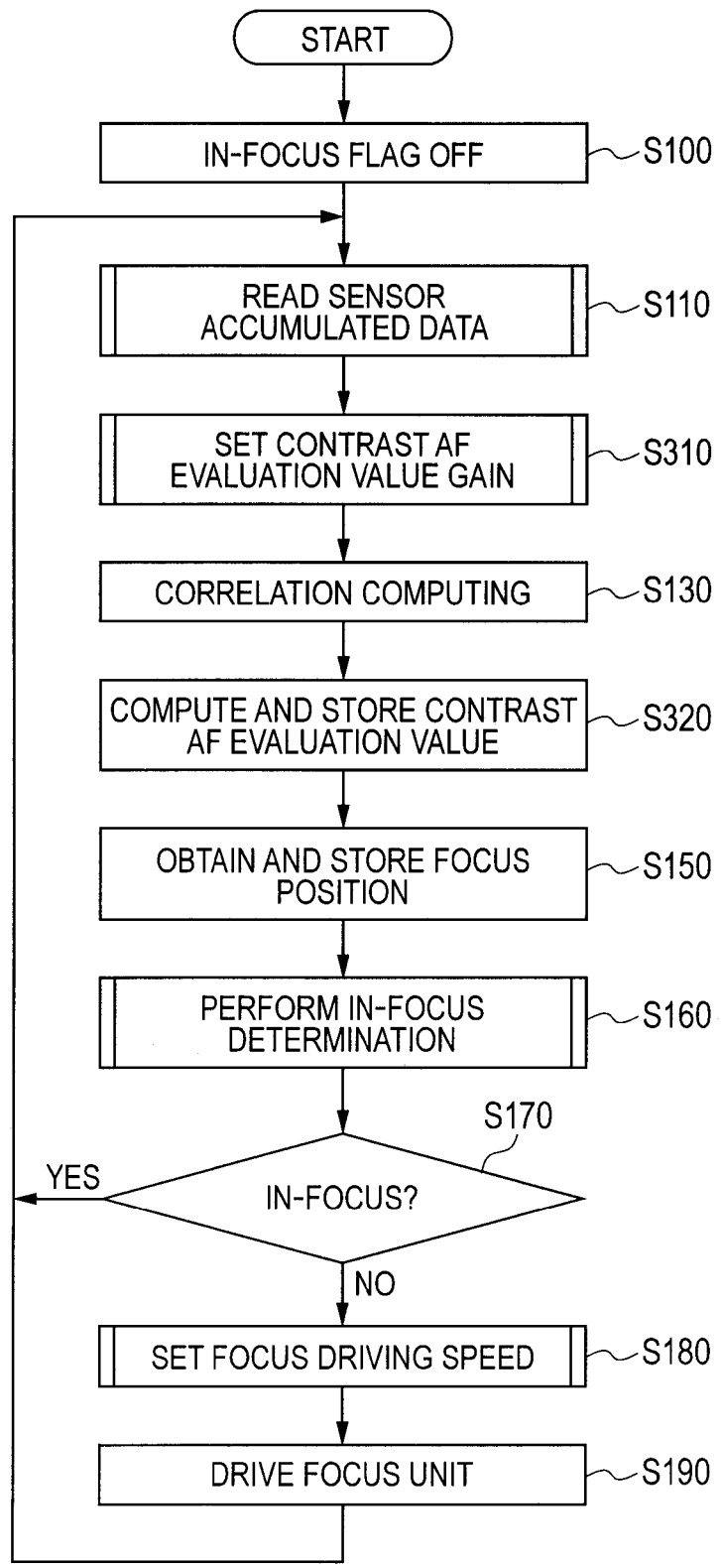
FIG. 19 is a flow chart of a process according to a third embodiment.

FIG. 19 is a flow chart illustrating a flow of an automatic focusing process in the lens apparatus 100. In the flow chart of FIG. 19, the same functions as in the flow chart of FIG. 3 illustrated in the first embodiment are designated with the same reference numerals, and the description is omitted. The CPU 130 controls the processes according to a computer program stored in a memory (not illustrated).

Figure 20:
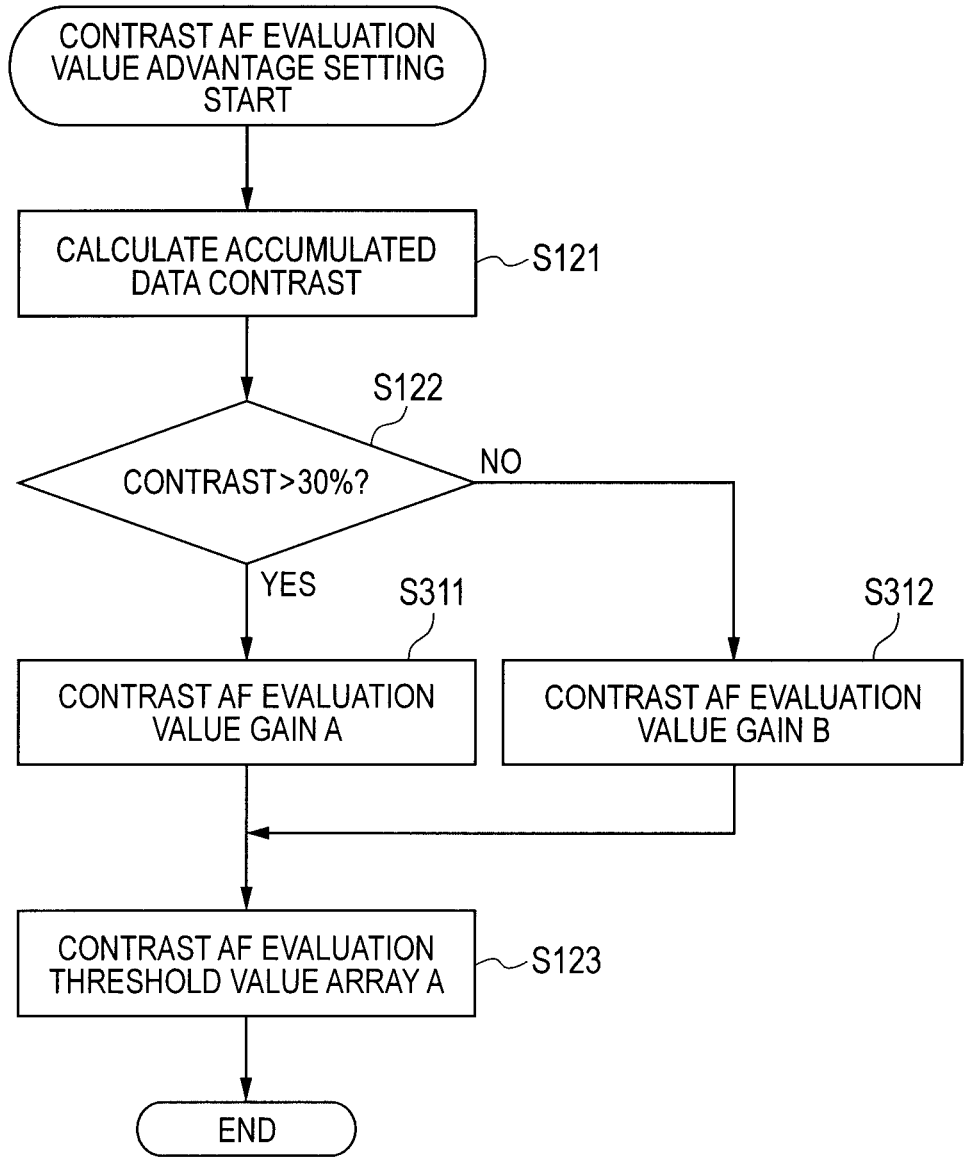
FIG. 20 is a subroutine of the process according to the third embodiment.

When the power of the lens apparatus 100 is turned on, the CPU 130 proceeds to step S100. The CPU 130 sets the in-focus flag to OFF as in the first embodiment and proceeds to step S110. The process executed in step S110 is the same as in the first embodiment. In step S310, a contrast AF evaluation gain is set. FIG. 20 illustrates a subroutine of step S310.

In FIG. 20, as in the first embodiment, the contrast (second data) is calculated from the accumulated data of the sensors 122 in step S121. The process proceeds to step S122, and whether the contrast is greater than 30% is determined. The process proceeds to step S311 if step S122 indicates true, and the process proceeds to step S312 if step S122 indicates false. In step S311, a contrast evaluation gain A is set. In step S312, a contrast evaluation gain B is set. In the setting example here, the contrast AF evaluation gain A=1 and the contrast evaluation gain B=2 are set. The gain setting value may be an arbitrary value satisfying A<B. Once step S311 or S312 is executed, the process proceeds to step S123. The contrast AF evaluation threshold value array A is set as in the first embodiment. The contrast AF evaluation threshold value array A is as illustrated in FIG. 7. The subroutine of FIG. 20 is finished, and the process proceeds to step S130 of FIG. 19.

Returning to the description of FIG. 19, as in the first embodiment, a known correlation computation is performed in step S130. The process proceeds to step S320. In step S320, the contrast AF evaluation values are obtained as in the first and second embodiments, and after obtaining the values, the contrast AF evaluation gain A or B described above is applied, computed and stored. As in the first embodiment, the contrast AF evaluation values, for which gain computations of three samples are applied, are stored.

The process proceeds to step S150. The same processes as in the first embodiment are executed in steps S150 to S190.

When the foregoing processes are executed, the gain is applied to the contrast AF evaluation value even if a low contrast object is imaged. Therefore, the same process as the focusing process in high contrast illustrated in FIG. 12 can be executed.

In this way, according to the present embodiment, the gain is applied to the obtained contrast AF evaluation value based on the contrast information obtained from the sensors 122 without changing the contrast AF evaluation threshold value array. Therefore, the same advantageous effects as in the first and second embodiments can be attained, and a quick and highly accurate automatic focusing process can be executed.

Although the exemplary embodiments of the present invention have been described, it is obvious that the present invention is not limited to the embodiments, and various modifications and changes can be made within the scope of the present invention.

For example, the processes described in the first to third embodiments may be combined and executed. A switching unit may also be provided to switch the processes to handle a plurality of imaging scenes.

Although examples of configuration in a focus detector of an external measurement phase difference method (non-TTL) have been illustrated in the first to third embodiments, a focus detector of a TTL phase difference method may also be adopted. For example, a half mirror may be included between the focus lens 111 and the image pickup element 201 in the lens apparatus 100, and the sensors 122 may be included inside the focal point detecting apparatus 100. The same advantageous effects can be obtained by using the beam separated from the half mirror to detect the focal point.

Although the completion of the accumulation by the sensors 122 is waited in the second embodiment, the sensor controller may mandatorily finish the accumulation in accordance with the sampling period (1/60 second in HD) of the contrast AF evaluation values. In this case or in the case where the accumulating time period is long, the accumulation may be finished in the middle, and the contrast may be determined to be low based on the luminance level and the contrast of the sensor data at this point. According to the configuration, the threshold value array can be set, and the gain of the contrast AF evaluation value can be set in the same way.

Examples of performing the low contrast determination based on the data and the accumulating time period of the phase difference sensors are illustrated in the first to third embodiments. In the case where photometry sensors form the phase difference sensors, the same advantageous effects can be obtained by determining the magnitude of the luminance level (luminance information) obtained from the photometric sensors relative to a predetermined level to perform the low contrast determination.

Although the first to third embodiments have been described on the assumption that the values (threshold values) of the elements of the contrast AF evaluation threshold value array are set in advance, a switch, a volume, or a communication unit (threshold value input unit) (not illustrated) may be arranged to allow changing the threshold values to be used according to the imaging conditions and the device in use. In the embodiments, although the control 135 executes the process of evaluating the contrast based on the waveforms obtained from the accumulated data of the sensors 122 and selecting and setting the threshold values based on the contrast, a unit (second threshold value setting unit) that sets the threshold values may be arranged to allow setting the threshold values from the outside.

In addition, although the values used in the determinations are written in constants, the values are arbitrary, and the values are not limited to the ones illustrated in the examples. The values may be written in a program in advance or may be changed later. The same advantageous effects can be attained even if the values are set from the outside.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-000647, filed Jan. 5, 2011, which is hereby incorporated by reference herein in its entirety.

What is claimed is:

1. An automatic focusing apparatus comprising:
    a first detector that detects first information based on a signal from a phase difference sensor;
    a second detector that detects second information based on a signal from an image pickup element;
    a focusing mechanism;
    a focus controller that controls the focusing mechanism based on the first information and the second information;
    a speed setting unit that sets, in a process obtaining an in-focus state using the focus controller, a driving speed for the focus controller to drive the focusing mechanism by comparing a threshold value with the second information; and
    a threshold value setting unit that sets the threshold value based on third information obtained by the phase difference sensor, the third information being different from the first information.

2. The automatic focusing apparatus according to claim 1, wherein the speed setting unit sets the driving speed of the focusing mechanism slower when the second information is equal to or greater than the threshold value compared to when the second information is smaller than the threshold value.

3. The automatic focusing apparatus according to claim 1, wherein the third information is an accumulating time period of a signal obtained from the phase difference sensor.

4. The automatic focusing apparatus according to claim 1, wherein the first detector detects a TTL phase difference that uses a beam separated from an image pickup optical system to detect the first information.

5. The automatic focusing apparatus according to claim 1, wherein the first detector detects an external measurement phase difference that uses a beam different from the beam entering the image pickup optical system to detect the first information.

6. The automatic focusing apparatus according to claim 1, wherein:
    the first information is a phase difference of the signal detected by the phase difference sensor,
    the second information is a first contrast of the signal detected by the image pickup element, and
    the third information is a second contrast of the signal detected by the phase difference sensor.

7. The automatic focusing apparatus according to claim 6, further comprising:
    a threshold value input unit that inputs an arbitrary threshold value; and
    a second threshold value setting unit that sets the input threshold value,
    wherein the focus controller compares the second information with the threshold value set by the second threshold value setting unit to set the driving speed of the focusing mechanism.

8. A lens apparatus comprising:
a focus lens; and
an automatic focusing apparatus comprising:
- a first detector that detects first information based on a signal from a phase difference sensor;
- a second detector that detects second information based on a signal from an image pickup element;
- a focusing mechanism;
- a focus controller that controls the focusing mechanism based on the first information and the second information;
- a speed setting unit that sets, in a process obtaining an in-focus state using the focus controller, a driving speed for the focus controller to drive the focusing mechanism by comparing a threshold value with the second information; and
- a threshold value setting unit that sets the threshold value based on third information obtained by the phase difference sensor, the third information being different from the first information,
- wherein the first information is a phase difference of the signal detected by the phase difference sensor,
- wherein the second information is a first contrast of the signal detected by the image pickup element, and
- wherein the third information is a second contrast of the signal detected by the phase difference sensor.

9. An image pickup system comprising:
a lens apparatus; and
an image pickup apparatus that picks up an object image formed by the lens apparatus, wherein the lens apparatus comprises:
a focus lens; and
an automatic focusing apparatus comprising:
- a first detector that detects first information based on a signal from a phase difference sensor;
- a second detector that detects second information based on a signal from an image pickup element;
- a focusing mechanism;
- a focus controller that controls the focusing mechanism based on the first information and the second information;
- a speed setting unit that sets, in a process obtaining an in-focus state using the focus controller, a driving speed for the focus controller to drive the focusing mechanism by comparing a threshold value with the second information; and
- a threshold value setting unit that sets the threshold value based on third information obtained by the phase difference sensor, the third information being different from the first information,
- wherein the first information is a phase difference of the signal detected by the phase difference sensor,
- wherein the second information is a first contrast of the signal detected by the image pickup element, and
- wherein the third information is a second contrast of the signal detected by the phase difference sensor.

10. An automatic focusing apparatus comprising:
- a first detector that detects first information based on a signal from a phase difference sensor;
- a second detector that detects second information based on a signal from an image pickup element;
- a focusing mechanism;
- a focus controller that controls the focusing mechanism based on the first information and the second information; and
- a speed setting unit that sets, in a process obtaining an in-focus state using the focus controller, a driving speed for the focus controller to drive the focusing mechanism based on the second information and third information obtained from the first detector, the third information being different from the first information.

11. A lens apparatus comprising:
a focus lens; and
an automatic focusing apparatus comprising:
- a first detector that detects first information based on a signal from a phase difference sensor;
- a second detector that detects second information based on a signal from an image pickup element;
- a focusing mechanism;
- a focus controller that controls the focusing mechanism based on the first information and the second information; and
- a speed setting unit that sets, in a process obtaining an in-focus state using the focus controller, a driving speed for the focus controller to drive the focusing mechanism based on the second information and third information obtained from the first detector, the third information being different from the first information.

12. An image pickup system comprising:
a lens apparatus; and
an image pickup apparatus that picks up an object image formed by the lens apparatus,
wherein the lens apparatus comprises:
a focus lens;
an automatic focusing apparatus comprising:
- a first detector that detects first information based on a signal from a phase difference sensor;
- a second detector that detects second information based on a signal from an image pickup element;
- a focusing mechanism;
- a focus controller that controls the focusing mechanism based on the first information and the second information; and
- a speed setting unit that sets, in a process obtaining an in-focus state using the focus controller, a driving speed for the focus controller to drive the focusing mechanism based on the second information and third information obtained from the first detector, the third information being different from the first information.

* * * * *